United States Patent
Nakajima

(10) Patent No.: US 9,471,931 B2
(45) Date of Patent: Oct. 18, 2016

(54) PRINTING DEVICE, CONTROL METHOD OF A PRINTING DEVICE, COUPON, AND CONTROL SYSTEM

(71) Applicant: Seiko Epson Corporation, Tokyo (JP)

(72) Inventor: Kiyofumi Nakajima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/439,511

(22) PCT Filed: Oct. 28, 2013

(86) PCT No.: PCT/JP2013/006346
§ 371 (c)(1),
(2) Date: Apr. 29, 2015

(87) PCT Pub. No.: WO2014/073179
PCT Pub. Date: May 15, 2014

(65) Prior Publication Data
US 2015/0262233 A1    Sep. 17, 2015

(30) Foreign Application Priority Data
Nov. 9, 2012   (JP) .................................. 2012-247149

(51) Int. Cl.
| G06F 15/00 | (2006.01) |
| G06Q 30/02 | (2012.01) |
| G07F 17/42 | (2006.01) |
| G06Q 20/04 | (2012.01) |
| G06Q 20/38 | (2012.01) |
| B42D 25/25 | (2014.01) |
| G06K 15/02 | (2006.01) |
| G07B 15/02 | (2011.01) |

(52) U.S. Cl.
CPC .......... *G06Q 30/0255* (2013.01); *B42D 25/25* (2014.10); *G06K 15/024* (2013.01); *G06Q 20/045* (2013.01); *G06Q 20/387* (2013.01); *G06Q 30/02* (2013.01); *G07F 17/42* (2013.01); *G07B 15/02* (2013.01)

(58) Field of Classification Search
CPC .......................... G06K 15/024; G06Q 20/045
USPC .......................................... 358/1.6, 1.15–1.18
See application file for complete search history.

(56) References Cited

U.S. PATENT DOCUMENTS

| 2003/0036930 A1* | 2/2003 | Matos .................... G06Q 10/02 705/5 |
| 2003/0149600 A1* | 8/2003 | Williams ............... G06Q 10/02 705/5 |
| 2005/0011958 A1* | 1/2005 | Fukasawa ......... G06F 17/30879 235/462.46 |
| 2011/0112916 A1* | 5/2011 | Baluja .................... G06Q 30/02 705/14.73 |
| 2011/0302035 A1* | 12/2011 | Stasio ................ G06Q 30/0241 705/14.61 |

FOREIGN PATENT DOCUMENTS

| JP | 2002-342654 A | 11/2002 |
| JP | 2005-025390 A | 1/2005 |

(Continued)

*Primary Examiner* — Saeid Ebrahimi Dehkordy

(57) ABSTRACT

Using coupons effectively is enabled. A host computer 18 that functions as a printing device has a vehicle information acquisition unit 25*a* that acquires vehicle information related to the vehicle a passenger boards, and a coupon production unit 25*b* that prints a code representing the vehicle information acquired by the vehicle information acquisition unit 25*a* on a coupon, and produces a coupon that is provided to the passenger.

6 Claims, 6 Drawing Sheets

(56) References Cited

FOREIGN PATENT DOCUMENTS

| JP | 2007-199589 A | 8/2007 |
| JP | 2007-279545 A | 10/2007 |
| JP | 2009-204847 A | 9/2009 |
| JP | 2011-198160 A | 10/2011 |

* cited by examiner (A)

| VEHICLE INFORMATION IDENTIFICATION NUMBER | SEAT CLASS | ORIGIN | DESTINATION | DEPARTS | ARRIVES |
|---|---|---|---|---|---|
| 00001 | ECONOMY CLASS | TOKYO | FUKUOKA | 10:00 | 13:00 |
| 00002 | BUSINESS CLASS | TOKYO | SAPPORO | 13:00 | 15:00 |
| 00003 | FIRST CLASS | TOKYO | NEW YORK | 10:00 | 19:00 |
| ⋮ | ⋮ | ⋮ | ⋮ | ⋮ | ⋮ |

(B)

| VEHICLE INFORMATION IDENTIFICATION NUMBER | PRODUCT INFORMATION | STORE-OF-PURCHASE INFORMATION | TIME-OF-PURCHASE INFORMATION | REGION-OF-PURCHASE INFORMATION |
|---|---|---|---|---|
| 00001 | PRODUCT G1, TYPE K1, 100 YEN, QTY 2 | STORE XX | 19:00 | REGION XX |
| 00001 | PRODUCT G1, TYPE K1, 100 YEN, QTY 1 | STORE XX | 7:00 | REGION XX |
| 00001 | PRODUCT G3, TYPE K3, 500 YEN, QTY 4 | STORE YY | 8:00 | REGION YY |
| 00002 | PRODUCT G2, TYPE K2, 150 YEN, QTY 1 | STORE ZZ | 20:00 | REGION ZZ |
| 00003 | PRODUCT G4, TYPE K1, 150 YEN, QTY 1 | STORE WW | 13:00 | REGION WW |
| ⋮ | ⋮ | ⋮ | ⋮ | ⋮ |

FIG. 4

PRINTING DEVICE, CONTROL METHOD OF A PRINTING DEVICE, COUPON, AND CONTROL SYSTEM

TECHNICAL FIELD

The present invention relates to a printing device that produces coupons, a control method of the printing device, the coupon, and a control system including the printing device and a server device.

BACKGROUND

Systems (coupon issuing systems) that produce (issue) coupons for a user are known from the literature (see, for example, PTL 1).

CITATION LIST

Patent Literature

[PTL 1] JP-A-2011-198160

SUMMARY OF INVENTION

Technical Problem

In a system that produces coupons such as the system described above, there is a need to use the produced coupon effectively.

The present invention is directed to the foregoing problem, and an object of the invention is to enable using coupons effectively.

Solution to Problem

To achieve the foregoing object, the present invention is a printing device characterized by comprising a vehicle information acquisition unit that acquires vehicle information related to a vehicle a passenger boards; and a coupon production unit that prints a code indicating the vehicle information acquired by the vehicle information acquisition unit on a coupon, and produces a coupon that is provided to the passenger.

Because a code indicating vehicle information related to the vehicle boarded by a passenger to whom a coupon is provided is printed on the coupon produced by the printing device in this configuration, the code can be used for analysis, such as analyzing the relationship between the vehicle the passenger boards and products the passenger purchases, and coupons can be used effectively.

In another aspect of the invention, the vehicle information includes information related to at least one of the origin, destination, departure or arrival time of a vehicle the passenger boards, and the class of seat the passenger occupies on the vehicle.

Because a code indicating valuable information, such as information related to at least one of the origin, destination, departure or arrival time of the vehicle boarded by the passenger to whom a coupon is provided, and the class of seat the passenger occupies on the vehicle, is printed on the coupon produced by the printing device, this configuration enables using coupons more effectively.

To achieve the foregoing object, another aspect of the invention is a control method of a printing device, including: acquiring vehicle information related to a vehicle a passenger boards; and printing a code indicating the acquired vehicle information on a coupon, and producing a coupon that is provided to the passenger.

Because a code indicating vehicle information related to the vehicle boarded by a passenger to whom a coupon is provided is printed on the coupon produced by the printing device with this control method, the code can be used for analysis, such as analyzing the relationship between the vehicle the passenger boards and products the passenger purchases, and coupons can be used effectively.

To achieve the foregoing object, another aspect of the invention is a coupon on which is printed a code indicating vehicle information related to a vehicle that a passenger boards.

Because a code indicating vehicle information related to the vehicle boarded by a passenger to whom a coupon is provided is printed on the coupon in this configuration, the code can be used for analysis, such as analyzing the relationship between the vehicle the passenger boards and products the passenger purchases, and coupons can be used effectively.

To achieve the foregoing object, another aspect of the invention is a control system including: a printing device including a vehicle information acquisition unit that acquires vehicle information related to a vehicle a passenger boards, and a coupon production unit that prints a code indicating the vehicle information acquired by the vehicle information acquisition unit on a coupon, and produces a coupon that is provided to the passenger; and a server device having a server control unit that, when a code is read in response to use of a coupon in conjunction with purchasing a product, acquires the vehicle information indicated by the read code, and product information related to the purchased product, and relationally stores this information in a storage unit.

Note that purchase of a product herein does not necessarily mean only the purchase of a physical good as the product, and conceptually includes all transaction processes for which the coupon can be used, including payment of compensation for a provided service.

In this configuration, a code indicating vehicle information related to the vehicle boarded by the passenger to whom the coupon is given is printed on a coupon produced by the printing device, and when the code is read from the coupon in conjunction with the purchase of a product, the server devices acquires the vehicle information indicated by the read code, and the product information related to the purchased product, and relationally stores the acquired information in the storage unit. As a result, the vehicle information and the product information can be used for various analyses, including appropriately analyzing a relationship between the vehicle the passenger boards and products the passenger purchases. More specifically, coupons can be used effectively.

Furthermore, in the invention the product information includes information related to at least one of the product that was purchased, the store where the product was purchased, when the product was purchased, and the region where the product was purchased.

This configuration enables more appropriate analyses using the information related to the products that are purchased, the stores where the products are purchased, when the products are purchased, and the region where the products are purchased that is contained in the product information.

The invention is further characterized by the server control unit of the server device analyzing the relationship between the vehicle the passenger boards and a product the passenger purchases based on the relationally stored vehicle information and product information.

This configuration enables acquiring the relationship between the vehicle a passenger boards and the products the passenger purchases, information that is extremely valuable for marketing.

The invention is further characterized by the server control unit of the server device analyzing the content of the coupon to be provided to a passenger boarding a specific vehicle based on the result of analyzing a relationship between the vehicle the passenger boards and a product the passenger purchases.

This configuration enables effectively producing coupons that are likely to be wanted by passengers boarding a specific vehicle based on the relationship between the vehicle to be boarded by a passenger and products purchased by the passenger.

ADVANTAGEOUS EFFECTS OF INVENTION

The present invention enables using coupons effectively.

BRIEF DESCRIPTION OF DRAWINGS

FIG. 4 shows the data structure of a database stored by the coupon management server.

DESCRIPTION OF EMBODIMENTS

A preferred embodiment of the invention is described below with reference to the accompanying figures.

Figure 1:
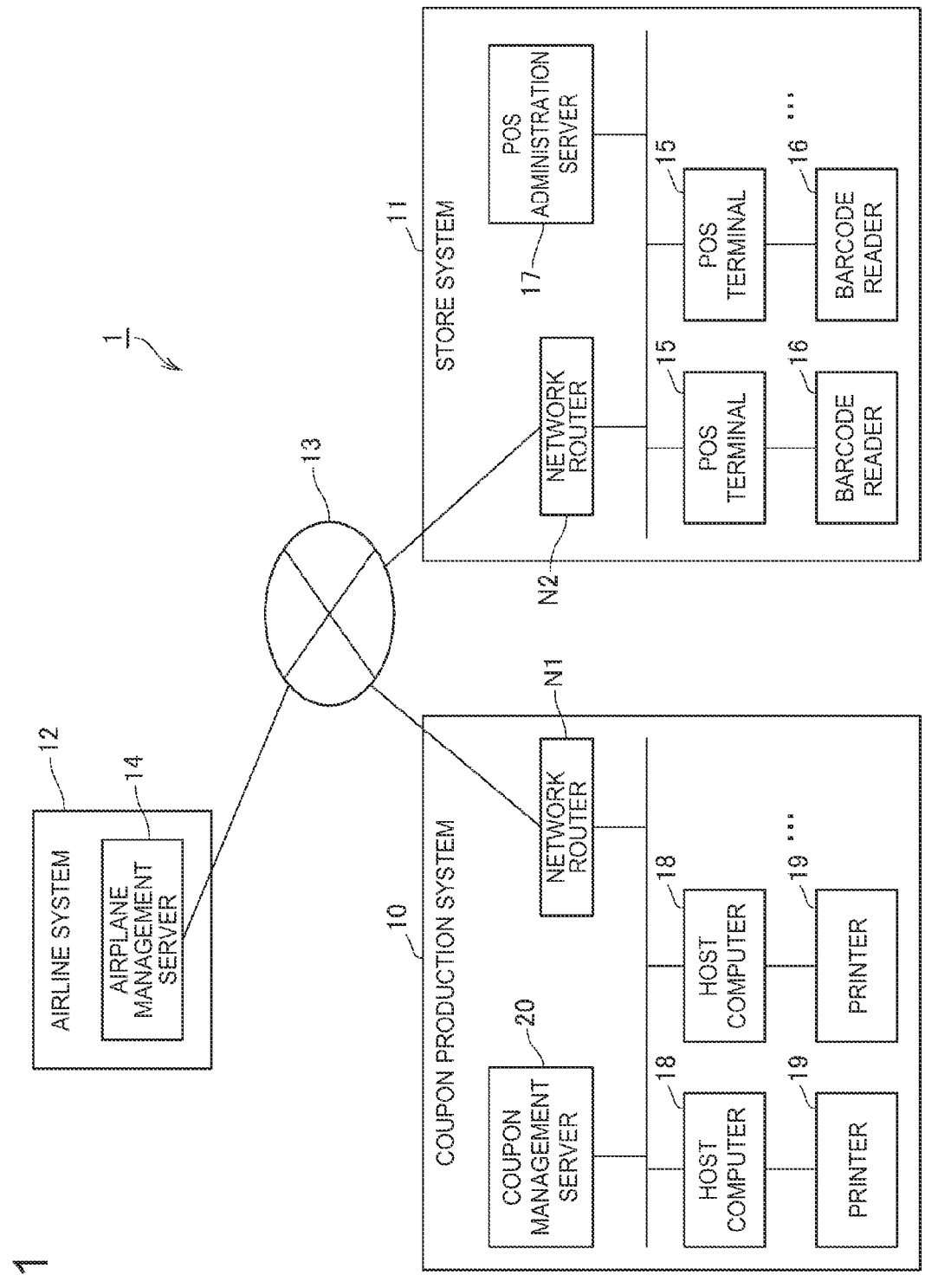
FIG. 1 shows the configuration of a control system according to an embodiment of the invention.

FIG. 1 shows the configuration of a control system 1

As shown in FIG. 1, the control system 1 includes a coupon product ion system 10, a store system 11, and an airline system 12, and these systems are connected through the Internet or other network 13.

The coupon production system 10 is a system with a function for producing coupons. More particularly, the coupon production system 10 according to this embodiment has a function for producing coupons that are presented to airline passengers, and for each flight can produce coupons that are different for each seating class (such as economy class, business class, and first class) on the flight. The coupons produced by the coupon production system 10 are given to the passengers by the flight attendants handing the coupons to the passengers, or by previously storing the coupons in a specific position (such as a pocket disposed to the seat) of the seats where the airline passengers sit. As shown in FIG. 1, the coupon production system 10 includes one or a plurality of host computers 18, and a printer 19 connected to each host computer 18 that produces coupons as controlled by the host computer 18. In this embodiment, the host computer 18 and printer 19 together function as a "printing device." A coupon management server 20 (server device) is connected to the host computer 18 through a LAN or other network. These devices in the coupon production system 10 are further described below. The coupon production system 10 and the network 13 are connected through a network router N1.

The store system 11 is a so-called POS system that is deployed in a retail store such as a supermarket, convenience store, or department store, or other type of business providing a service, including barbershops, hospitals, and food service establishments. The store system 11 has one or a plurality of POS terminals 15. The POS terminal 15 is a device that is installed at the checkout counter in a store, for example, and executes transaction-related processes, and is connected to a printer that produces receipts, a cash register that stores money used in transactions, and a customer display that displays and presents transaction-related information to the customer. A barcode reader 16 that optically reads at least barcodes and symbol codes such as two-dimensional codes is connected to the POS terminal 15. A POS administration server 17 is also connected in this store system 11 to each POS terminal 15 through a LAN or other network. The POS administration server 17 stores a product master file, a customer master file, and an inventory master file, and centrally manages the store system 11. The store system 11 and network 13 are connected through a network router N2.

The airline system 12 is a system deployed by an airline company, and includes an airplane management server 14 for managing flight operations.

Figure 2:
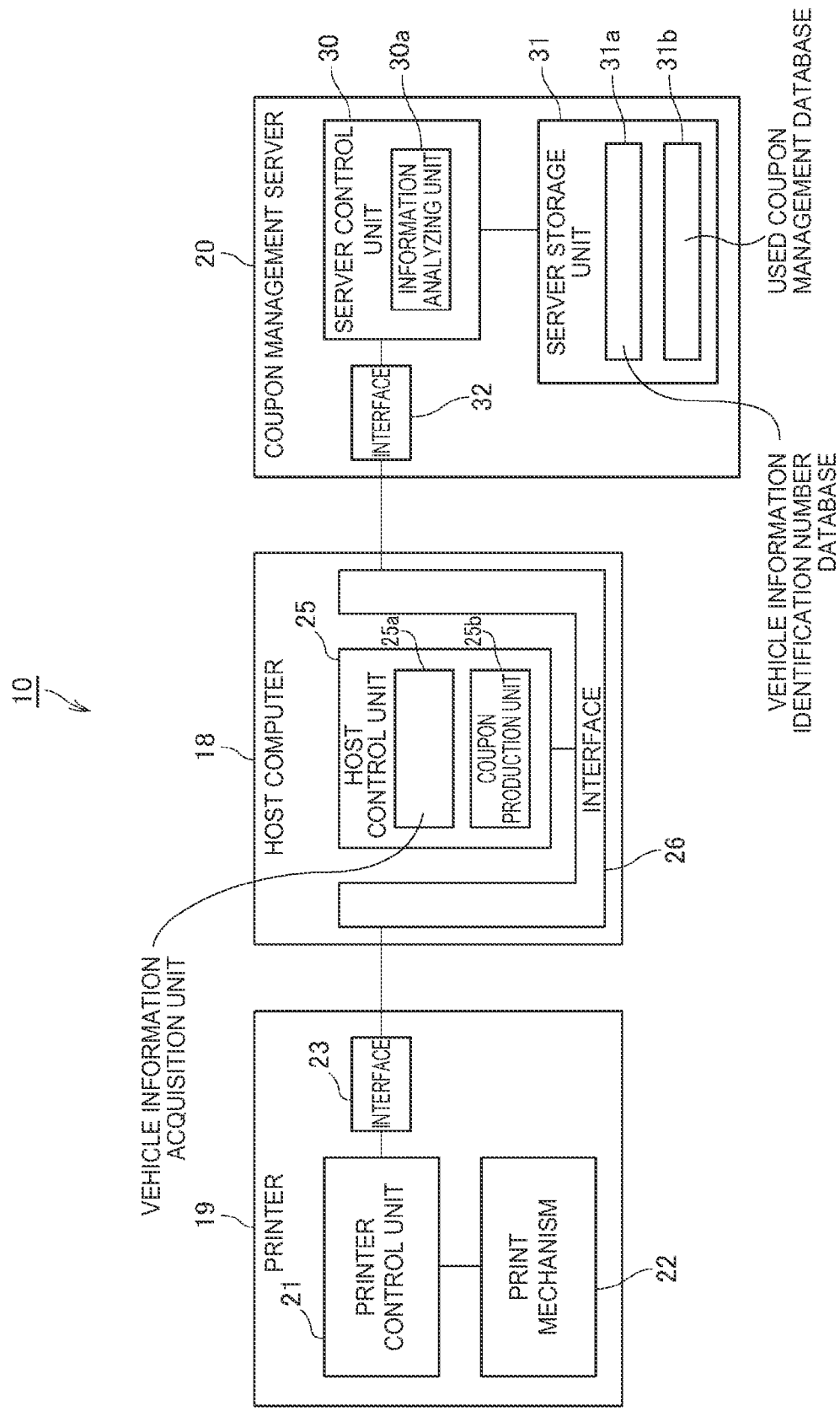
FIG. 2 is a block diagram showing the functional configuration of devices in a coupon production system.

FIG. 2 is a block diagram showing the functional configuration of a printer 19 in the coupon production system 10, the host computer 18, and the coupon management server 20.

The printer 19 is a device with a function for producing coupons by recording an image related to the coupon on stored roll paper, and then cutting the paper at a specific position, and includes a printer control unit 21, a print mechanism 22, and an interface 23. The printer control unit 21 includes a CPU, ROM, RAM, and other peripheral circuits, and controls parts of the printer 19 by reading and running firmware or other program. The print mechanism 22 includes mechanisms and devices needed to produce coupons, including a recording head such as an inkjet head or thermal head, a conveyance mechanism for conveying the roll paper, and a cutting mechanism for cutting the roll paper. The interface 23 communicates with the host computer 18 according to a specific communication protocol as controlled by the printer control unit 21.

The host computer 18 is a computer that controls the printer 19 and causes the printer 19 to produce a coupon, and includes a host control unit 25 and an interface 26. The host control unit 25 includes a CPU, and controls parts of the host computer 18. A vehicle information acquisition unit 25a, and a coupon production unit 25b, which are function blocks of the host control unit 25, are described below. The interface 26 communicates with the printer 19 and coupon management server 20 according to a specific communication protocol as controlled by the host control unit 25.

The coupon management server 20 is a server that stores databases used by the coupon production system 10, and centrally manages the coupon production system 10, and includes a server control unit 30, a server storage unit 31, and an interface 32. The server control unit 30 includes a CPU, and controls parts of the coupon management server 20. An information analyzing unit 30a that is a function block of the server control unit 30 is described further below. The server storage unit 31 includes a hard disk drive or EEPROM device, for example, and nonvolatilely stores data rewritably. A vehicle information identification number database 31a and a used coupon management database 31b that are stored in the server storage unit 31 are described below. The interface 32 communicates with the host computer 18 according to a specific communication protocol as controlled by the server control unit 30.

As described above, the coupon production system 10 produces coupons that are provided to passengers of an airplane, each coupon differing according to the flight and the classes of seats on the flight (such as economy class, business class, first class).

The operation of devices in the coupon production system 10 when producing a coupon is described below.

Figure 3:
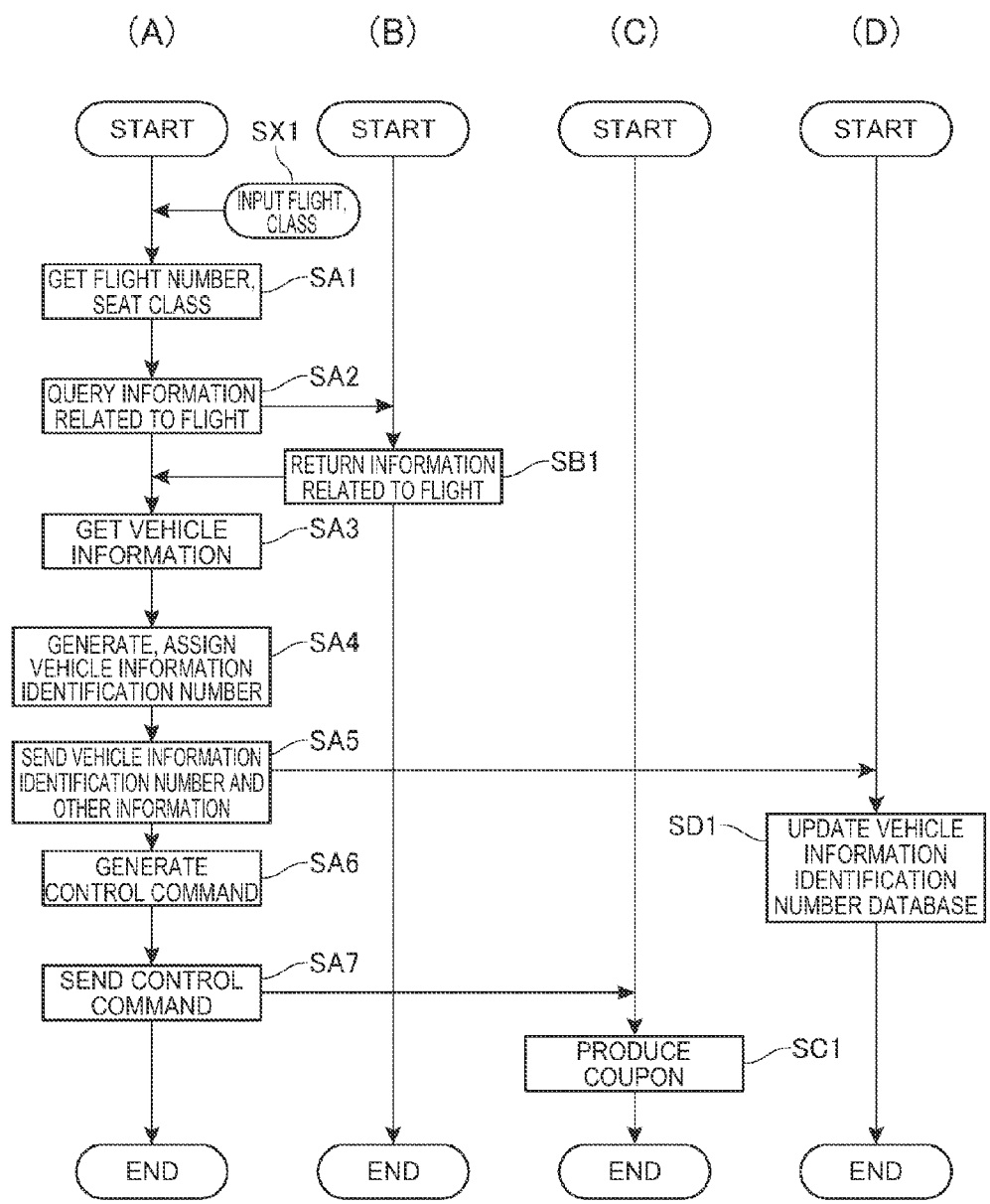
FIG. 3 is a flow chart of the operation of devices in the control system.

FIG. 3 is a flow chart showing the operation of devices when producing a coupon, column (A) showing the operation of the host computer 18, column (B) showing the operation of the airplane management server 14, column (C) showing the operation of the printer 19, and column (D) showing the operation of the coupon management server 20. In the following description, the functions of the vehicle information acquisition unit 25a and coupon production unit 25b are rendered by the cooperation of hardware and software, such as the CPU of the host control unit 25 reading and running application and printer driver programs.

To produce a coupon, the user first inputs information indicating the flight number of the plane to be boarded by the customer to whom the coupon to be produced will be issued, and information indicating the seat class of the passenger (step SX1). Note that the host computer 18 has a function for providing a user interface for inputting this information, and the user can easily input this information through the interface.

When the flight number and seat class information are input, the vehicle information acquisition unit 25a of the host control unit 25 of the host computer 18 acquires this information (step SA1). This information is also referred to herein as "vehicle information related to the vehicle a passenger boards."

Next, the vehicle information acquisition unit 25a queries the airplane management server 14 through the network 13 to get the origin, the destination, the departure time, and the arrival time of the flight corresponding to the flight number input in step SX1 (step SA2). The protocol used for the query is predefined.

When the query is received, the airplane management server 14 references the corresponding databases to retrieve information indicating the origin, destination, departure time, and arrival time of a flight, for example, and returns the retrieved information (step SB1).

Based on the response from the airplane management server 14 in step SB1, the vehicle information acquisition unit 25a acquires the information about the origin, destination, departure time, and arrival time of the flight corresponding to the flight number input in step SX1 (step SA3). This information is also referred to herein as the "vehicle information related to the vehicle a passenger boards."

Note that this embodiment is configured so that the host computer 18 queries the airplane management server 14 for the origin, destination, departure time, and arrival time of the flight, but may be configured so that the user inputs this information.

Next, the coupon production unit 25b generates and assigns a vehicle information identification number, which is a unique identification number, to the combination of seat class, and the origin, destination, departure time, and arrival time of the flight (step SA4). In other words, a unique identification number is assigned to each combination of seat class, origin, destination, departure time, and arrival time of a flight by the process of step SA4.

Next, the coupon production unit 25b sends the generated vehicle information identification number, and the combination of the seat class, origin, destination, departure time, and arrival time of the flight corresponding to the identification number, together with a control command to update the vehicle information identification number database 31a based on the information to the coupon management server 20 (step SA5).

After receiving the control command, the server control unit 30 of the coupon management server 20 updates the vehicle information identification number database 31a as follows (step SD1).

FIG. 4 (A) shows the basic data structure of the vehicle information identification number database 31a.

As shown in this figure, one record of the vehicle information identification number database 31a has fields for storing the vehicle information identification number, the seat class, and the origin, destination, departure time, and arrival time of the flight.

In step SD1, the server control unit 30 generates one record in the vehicle information identification number database 31a and stores information indicating the origin, destination, departure time, and arrival time of the flight received from the host computer 18 in the appropriate fields of the generated record.

One record relating the vehicle information identification number to the combination of seat class, origin, destination, departure time, and arrival time of the flight is thus created in the vehicle information identification number database 31a by the process of this step SD1.

Using functions of a previously installed coupon production application and printer driver, the coupon production unit 25b of the host control unit 25 of the host computer 18 generates a control command that is a control command conforming to the command language of the printer 19 and causes the printer 19 to execute operations related to producing a coupon (step SA6). Note that information related to the image of the coupon to be produced is previously input to the application by a specific means.

In step SA6, the coupon production unit 25b generates control commands including a command instructing printing a code (in this example, a barcode of a specific standard) for the vehicle information identification number at a specific position in the recordable area of the recording surface of the coupon.

Next, the coupon production unit 25b sends the control command generated in step SA6 to the printer 19 (step SA7).

When the control command is received, the printer control unit 21 of the printer 19 controls the print mechanism 22 to produce a coupon by a function of firmware based on the received control command (step SC1).

Figure 5:
FIG. 5 shows an example of a coupon.

FIG. 5 shows an example of a coupon produced in step SC1.

As shown in FIG. 5, a barcode (referred to below as a vehicle information identification number barcode) encoding the vehicle information identification number is printed on the recording surface of the coupon.

More specifically, a code representing the vehicle information related to the flight (vehicle) a passenger boards, and more specifically a barcode encoding the vehicle information identification number, is printed on the coupon produced by the host computer 18 and printer 19 functioning as a printing device in this embodiment. This vehicle information identification number is identification information related to a specific combination of seat class, origin, destination, departure time, and arrival time of a flight.

The operation of the POS terminal 15 and the POS administration server 17 of the store system 11, and the coupon management server 20 of the coupon production system 10, when a coupon produced by the coupon production system 10 is used are described next.

The flow until a coupon is used is as described below.

Specifically, a passenger that boarded a particular flight acquires by a specific means a coupon produced by the coupon production system 10 appropriately to the seat class and flight number of the plane the passenger boarded. The specific means includes, for example, acquiring a coupon from a pocket disposed near the passenger's seat, or the coupon being handed to the passenger by a flight attendant.

When purchasing a product to which the coupon can be applied in a store where the coupon can be used, the passenger hands the coupon to the checkout clerk. The coupon is thus used by the passenger.

Figure 6:
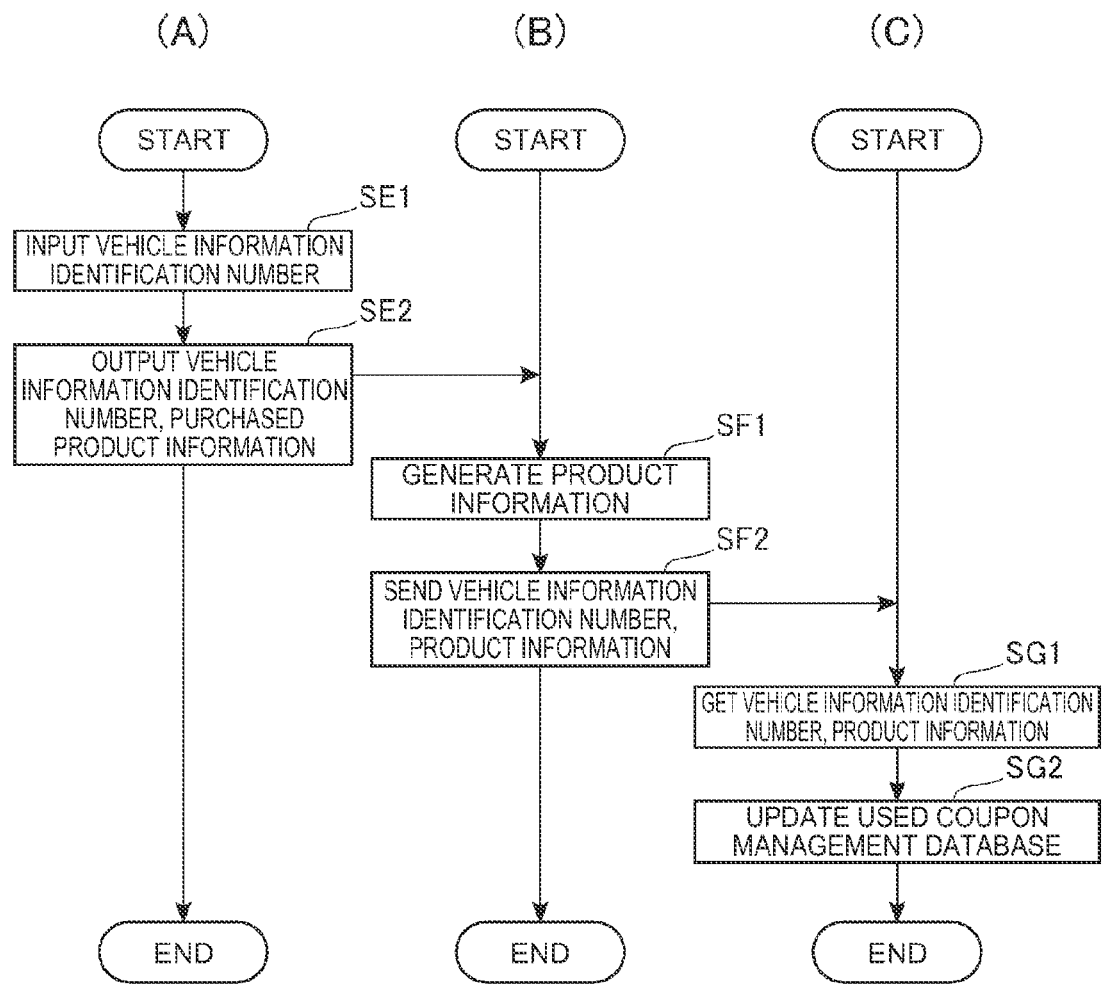
FIG. 6 is a flow chart of the operation of devices in the control system.

FIG. 6 is a flow chart showing the operation of devices when a coupon produced by the coupon production system 10 is used, (A) showing the operation of the POS terminal 15, (B) showing the operation of the POS administration server 17, and (C) showing the operation of the coupon management server 20.

When a coupon is used in a store where the store system 11 is deployed, the POS terminal 15 appropriately executes a transaction process after applying the discount indicated by the coupon. At this time, the vehicle information identification number barcode printed on the coupon is read with the barcode reader 16, and the read result, that is, the vehicle information identification number, is input to the POS terminal 15 (step SE1).

Next, the POS terminal 15 outputs information indicating the purchased product (referred to below as the "purchased product information") together with the vehicle information identification number to the POS administration server 17 (step SE2). Note that the purchased product information in this example includes the product code of the purchased product, the type of product, the product price, and the quantity of each product purchased in the transaction in which the coupon was used. Other information, such as product attributes, may also be included.

Note that purchase of a product herein does not necessarily mean only the purchase of a physical good as the product, and conceptually includes all transaction processes for which the coupon can be used, including payment of compensation for a provided service.

When the vehicle information identification number and purchased product information are input, the POS administration server 17 generates, in addition to the purchased product information, product information including information identifying the store where the product was purchased (such as an identification code uniquely assigned to each store, below referred to as the "store-of-purchase information"), information indicating when the product was purchased (referred to below as the "time-of-purchase information"), and information indicating the region where the product was purchased (referred to below as the "region-of-purchase information") (step SF1). Note that when the product was purchased is not limited to the time the product was purchased, and may be the date, a time period, or a season. More specifically, it may be any information including a concept of time.

Next, the POS administration server 17 sends the vehicle information identification number based on the result of reading by the barcode reader 16, and the product information generated in step SF1, to the coupon management server 20 according to a specific communication protocol (step SF2).

As a result of the POS administration server 17 sending the vehicle information identification number (information corresponding to the vehicle information) and the product information, the server control unit 30 of the coupon management server 20 acquires this information (step SG1). Next, the server control unit 30 updates the content of the used coupon management database 31b based on the acquired information (step SG2).

FIG. 4 (B) shows the basic data structure of the used coupon management database 31b.

As shown in this figure, one record of the used coupon management database 31b has fields for storing the vehicle information identification number, purchased product information, store-of-purchase information, time-of-purchase information, and region-of-purchase information, respectively.

In step SG2, the server control unit 30 generates one record in the used coupon management database 31b, and based on the information acquired in step SG1, stores the vehicle information identification number, purchased product information, store-of-purchase information, time-of-purchase information, and region-of-purchase information, in the appropriate fields of the created record.

In steps SG1 and SG2 above, the server control unit 30 of the coupon management server 20 (server device) acquires the vehicle information (vehicle information identification number) indicated by the read code, and the product information (purchased product information, store-of-purchase information, time-of-purchase information, and region-of-purchase information) related to the purchased product when the code is read from the coupon in conjunction with the purchase of a product, and relationally stores the acquired information in the used coupon management database 31b in the storage unit (server storage unit 31).

Because of this configuration, various analyses are possible using the used coupon management database 31b, including appropriately analyzing the relationship between the vehicle a passenger boards and the products the passenger purchases. More specifically, effective use of coupons is enabled.

The information analyzing unit 30a, which is a function block of the server control unit 30 of the coupon management server 20, is described next. The function of the information analyzing unit 30a is rendered by the cooperation of hardware and software, such as a CPU reading and running a program.

A first function of the information analyzing unit 30a is a function for analyzing the relationship between the vehicle a passenger boards and products the passenger purchases based on the content of the used coupon management database 31b.

Note that the information analyzing unit 30a can use all existing data mining methods and statistical methods in the analyses described below.

A specific example of the first function is described below.

The (1) seat class, origin, destination, departure time, and arrival time of a flight, and (2) purchased product information, store-of-purchase information, time-of-purchase information, and region-of-purchase information, are relationally stored in the used coupon management database 31b.

Based thereon, the information analyzing unit 30a can analyze the relationship between the seat class and the purchased products or type of products, for example. More specifically, the information analyzing unit 30a can analyze trends, such as economy class passengers tending to purchase product G1 of products of type K1, and business class passengers tending to purchase product G2 of products of type K1, for example.

The information analyzing unit 30a may also analyze the relationship between the origin and destination of a flight, and the stores where products are purchased or regions where products are purchased, for example. More specifically, the information analyzing unit 30a analyzes trends such as a tendency to purchase products at a particular store or purchase products in a particular region when the origin (destination) is XX.

The information analyzing unit 30a may also analyze the relationship between the origin and destination of a flight, and the time when products are purchased, for example. More specifically, the information analyzing unit 30a analyzes trends such as a tendency to purchase products in a specific period of time when the time of departure (time of arrival) of the flight is associated with a specific period of time.

The analyses performed by the first function of the information analyzing unit 30a are described with reference to specific examples, but the type of analysis is not limited to the foregoing. More specifically, because this embodiment of the invention relationally stores data that is not conventionally stored, specifically data relating vehicle information and product information, in the used coupon management database 31b, the relationship between the vehicle boarded by a passenger and products purchased by the passenger can be analyzed from diverse points of view using this information.

A second function of the information analyzing unit 30a is described next.

The second function of the information analyzing unit 30a is a function that analyzes the content of coupons provided to passengers boarding a specific vehicle based on the result of analyzing the relationship between the vehicles boarded by a passenger and the products purchased by the passenger based on the content of the used coupon management database 31b.

This second function is described more specifically below.

For example, the information analyzing unit 30a analyzes the relationship between seat class and the products that are purchased or the type of products, and based on the result of this analysis, analyzes the content of coupons that should be provided to passengers in seats of a specific class. Using a more specific example, if the information analyzing unit 30a performs an analysis that detects a tendency of economy class passengers to purchase product G1 of products of type K1, and a tendency of business class passengers to purchase product G2 of products of type K1, the information analyzing unit 30a determines based on the result of this analysis that the content of coupons for economy class is content related to product G1, and the content of coupons for business class is content related to product G2.

In another example, the information analyzing unit 30a analyzes the relationship between the origin and destination of a flight, and the stores where products are purchased or regions where products are purchased. Using a more specific example, if the information analyzing unit 30a performs an analysis that detects a tendency for passengers on a flight with an origin (destination) of XX to purchase products at a particular store or purchase products in a particular region, then the information analyzing unit 30a determines based on the result of this analysis that content related to a specific store and/or a specific region (such as content for coupons that can be used in a specific store) is suitable as the content of coupons distributed on a flight with an origin (destination) of XX.

In another example, the information analyzing unit 30a analyzes the relationship between the time of departure and the time of arrival of a flight, and the time when products are purchased, and based on the result of the analysis determines the content of coupons to be distributed to passengers on flights with a departure time (arrival time) in a particular time period. Using a more specific example, if the information analyzing unit 30a detects a trend for products to be purchased during a specific time period when the departure time (arrival time) of the flight is in a particular time band, the information analyzing unit 30a may determine based on the result of the analysis that content related to the specific time period (such as content for coupons that can be used during the specific time period) is appropriate as the content of coupons distributed on flights with a departure time in the particular time band.

Specific examples of analyses performed by the second function of the information analyzing unit 30a are described above, but the type of analysis is not limited to the foregoing examples. More specifically, because this embodiment of the invention relationally stores data relating vehicle information and product information, which is data that is not conventionally stored, in a used coupon management database 31b, the relationship between the vehicles boarded by passengers and the products purchased by the passengers can be analyzed using this information, and based on the results of the analysis, analyses from different points of view are possible.

As described above, a host computer 18 that functions as part of a printing device according to this embodiment includes a vehicle information acquisition unit 25a that acquires vehicle information related to the vehicle boarded by a passenger to whom the coupon is to be provided, and a coupon production unit 25b that prints a code representing the vehicle information acquired by the vehicle information acquisition unit 25a on a coupon, and produces a coupon that is provided to a passenger on that vehicle.

Because this configuration prints a code representing the vehicle information related to the vehicle boarded by the passenger to whom the coupon is given on the coupon produced by the printing device, analyses such as analyzing the relationship between the vehicle the passenger boards and the products purchased by the passenger are possible using these codes, and the coupons can be used effectively.

The vehicle information in this embodiment includes information related to the origin or destination of a vehicle boarded by a passenger, the departure or arrival time, and the class of seat occupied by the passenger on the vehicle.

This configuration enables coupons to be used more effectively by printing a code representing valuable information, such as information related to the origin or destination of a vehicle boarded by a passenger, the departure or arrival time, and the class of seat occupied by the passenger on the vehicle, on the coupon printed by the printing device.

A code for the vehicle information related to the vehicle boarded by the passenger to whom the coupon is provided is printed on the coupon produced by the host computer 18 and printer 19 that function as a printing device in this embodiment of the invention.

Because a code for the vehicle information related to the vehicle boarded by the passenger to whom the coupon is provided is printed on the coupon, this configuration enables using this code to analyze the relationship between the vehicle boarded by the passenger and products purchased by the passenger, and enables using coupons effectively.

The coupon management server 20 (server device) according to this embodiment has a server control unit 30 that, when the code is read when a coupon is used in conjunction with a product purchase, acquires the vehicle information identified by the read code, and product information related to the product that was purchased, and relationally stores this information in the server storage unit 31 (storage unit).

In this configuration, a code for the vehicle information related to the vehicle boarded by the passenger to whom the coupon is provided is printed on a coupon produced by the printing device, and when the code is read when the coupon is used in conjunction with a product purchase, the server device acquires the vehicle information identified by the read code, and product information related to the product that was purchased, and relationally stores this information in a storage unit. As a result, various analyses are possible using the vehicle information and the product information, including appropriately analyzing the relationship between the vehicle a passenger boards and the products the passenger purchases. More specifically, effective use of coupons is enabled.

In this embodiment, the product information includes information related to the products that are purchased, the stores where the products are purchased, when the products are purchased, and the region where the products are purchased.

This configuration enables more appropriate analyses using the information related to the products that are purchased, the stores where the products are purchased, when the products are purchased, and the region where the products are purchased that is contained in the product information.

The coupon management server 20 and server control unit 30 in this embodiment of the invention analyze relationships between the vehicle boarded by a passenger and products that the passenger purchases based on relationally stored vehicle information and product information.

This configuration enables acquiring the relationship between the vehicle a passenger boards and the products the passenger purchases, information that is extremely valuable for marketing.

The coupon management server 20 and server control unit 30 in this embodiment of the invention analyze the content of coupons to be provided to passengers boarding a specific vehicle based on the result of analyzing the relationship between the vehicle boarded by a passenger and the products that the passenger purchased.

This configuration enables effectively producing coupons that are likely to be wanted by passengers boarding a specific vehicle based on the relationship between the vehicle to be boarded by a passenger and products purchased by the passenger.

The invention is described above with reference to a preferred embodiment thereof, but the invention is not limited thereto and can be modified and adapted in many ways without departing from the scope of the accompanying claims.

For example, airplanes are used as an example of a vehicle in the foregoing embodiment, but the vehicle is not limited thereto and may be a train, bus, boat, or other vehicle.

In addition, the host computer 18 and printer 19 work together as a printing device in the foregoing embodiment. However, because the printer 19 has functions including a vehicle information acquisition unit 25*a* and a coupon production unit 25*b*, and a configuration in which the printer 19 alone functions as the printing device is also conceivable.

Yet further, the function blocks shown in FIG. 2 are achieved by the cooperation of hardware and software, but do not suggest a specific hardware configuration. Devices can also operate as described above by executing a program stored on an externally connected storage medium.

INDUSTRIAL APPLICABILITY

As described above, the invention is useful for a printing device that produces coupons, a control method of the printing device, the coupon, and a control system including the printing device and a server device, and is particularly suited to enabling using the coupons that are produced effectively.

REFERENCE SIGNS LIST

1 control system
10 coupon production system
11 store system
12 airline system
17 POS administration server
18 host computer (printing device)
19 printer (printing device)
20 coupon management server (server device)
21 printer control unit
25 host control unit
25*a* vehicle information acquisition unit
25*b* coupon production unit
30 server control unit
30*a* information analyzing unit
31 server storage unit (storage unit)

The invention claimed is:

1. A printing device comprising:
a first controller that acquires vehicle information related to a ticket of a vehicle a passenger boards; and
a second controller that generates a code indicating the vehicle information acquired by the first controller on a coupon, and produces a coupon to be printed and provided to the passenger,
wherein the vehicle information includes information related to at least one of the origin, destination, departure or arrival time of the vehicle the passenger boards and the class of seat the passenger occupies on the vehicle.

2. A control method of a printing device, comprising:
acquiring, using a first controller, vehicle information related to a ticket of a vehicle a passenger boards; and
generating, using a second controller, a code indicating the acquired vehicle information on a coupon, and producing a coupon that is provided to the passenger,
wherein the vehicle information includes information related to at least one of the origin, destination, departure or arrival time of the vehicle the passenger boards, and the class of seat the passenger occupies on the vehicle.

3. A control system comprising:
a printing device including a first controller that acquires vehicle information related to a ticket of a vehicle a passenger boards, and
a second controller that generates a code indicating the vehicle information acquired by the first controller on a coupon, and produces a coupon to be printed and provided to the passenger; and a server device having a server controller that, when a code is read in response to use of a coupon in conjunction with purchasing a product, acquires the vehicle information indicated by the read code, and product information related to the purchased product, and relationally stores this information in a storage, wherein the vehicle information includes information related to at least one of the origin, destination, departure or arrival time of the vehicle the passenger boards, and the class of seat the passenger occupies on the vehicle.

4. The control system described in claim 3, wherein:

the product information includes information related to at least one of the product that was purchased, the store where the product was purchased, when the product was purchased, and the region where the product was purchased.

5. The control system described in claim 3, wherein:

the server controller of the server device analyzes a relationship between the vehicle the passenger boards and a product the passenger purchases based on the relationally stored vehicle information and product information.

6. The control system described in claim 3, wherein:

the server controller of the server device analyzes the content of the coupon to be provided to a passenger boarding a specific vehicle based on the result of analyzing a relationship between the vehicle the passenger boards and a product the passenger purchases.

* * * * *